United States Patent
Stengele

(10) Patent No.: US 6,785,624 B2
(45) Date of Patent: Aug. 31, 2004

(54) METHOD FOR CALIBRATING OF MACHINE UNITS LOCATED IN MACHINE TOOLS OR ROBOTIC DEVICES

(75) Inventor: Gerald Stengele, Ludwigsburg (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/378,541

(22) Filed: Mar. 3, 2003

(65) Prior Publication Data

US 2003/0220756 A1 Nov. 27, 2003

(30) Foreign Application Priority Data

Mar. 1, 2002 (DE) .......................... 102 09 141

(51) Int. Cl.[7] .......................... G01C 17/38; G06F 19/00; G01P 21/00
(52) U.S. Cl. .............................. 702/94; 702/85; 702/95; 700/254; 700/259
(58) Field of Search .............................. 702/85, 86, 94, 702/95, 150, 151, 152, 153; 700/254, 259; 901/2, 16

(56) References Cited

U.S. PATENT DOCUMENTS 4,831,549 A * 5/1989 Red et al. ................... 700/254
5,297,238 A * 3/1994 Wang et al. ................. 700/259
5,644,512 A * 7/1997 Chernoff et al. .............. 702/85
6,328,510 B1   12/2001 Hanrath et al.

FOREIGN PATENT DOCUMENTS

| DE | 198 06 085 A1 | 4/1999 |
| DE | 198 18 635 A1 | 11/1999 |
| WO | WO 99/28097 | 6/1999 |

OTHER PUBLICATIONS

Kalman–Bucy–Filter, p. 71, Oldenbourg Verlag München Vienna, 1989.

Matrizen und ihre Anwendungen 1 of R. Zurmühl, S. Falk, Springe Verlag, 1992, section 8.6 and 12.1 (No English Translation).

* cited by examiner

Primary Examiner—Bryan Bui
(74) Attorney, Agent, or Firm—Henry M. Feiereisen

(57) ABSTRACT

In a method for calibrating machine units in machine tools and robotic devices that perform a parallel-kinematic motion in a motion space, the position of the machine unit relative to a reference system is determined from the totality of the positions of all drives operating in parallel of the machine units, whereby each drive moves relative to the reference system a single drivetrain that is associated exclusively with the drive. The machine units can be calibrated using a robust and efficient iterative process that generates a kinematic transformation.

14 Claims, 3 Drawing Sheets

METHOD FOR CALIBRATING OF MACHINE UNITS LOCATED IN MACHINE TOOLS OR ROBOTIC DEVICES

CROSS-REFERENCES TO RELATED APPLICATIONS

This application claims the priority of German Patent Application, Serial No. 102 09 141.2, filed Mar. 1, 2002, pursuant to 35 U.S.C. 119(a)–(d), the disclosure of which is incorporated herein by reference.

BACKGROUND OF THE INVENTION

The invention relates to a method for calibrating and operating machine units in machine tools and robotic devices that perform a parallel-kinematic motion in a motion space.

The term "parallel-kinematic" is used to describe machines with drives, wherein the position of a machine unit relative to a reference system can be derived from the totality of the positions of all drives operating in parallel on the machine unit, wherein each drive exclusively moves a single drive train relative to the reference system which is associated with this drive.

Machine units that are moved by a parallel kinematics can have a different number of degrees of freedom, depending on the design and number of drives and additional constraints, such as bearings and guides. As with classical (i.e., serial machine kinematics) a kinematic degree of freedom of a moved machine unit is defined by each drive which is typically uniaxial. However, unlike the serial machine kinematics, individual drives cannot be associated with individual degrees of freedom of the machine unit.

Parallel-kinematics are employed with machine tools, but can also have other applications, for example in robotic devices, which are described, for example, in U.S. Pat. No. 6,328,510 B1, which is incorporated herein by reference in its entirety.

The simplest calibration method according to the state-of-the-art includes a very precise measurement of all individual components as well as the entire assembly. This method has a disadvantage that it is very complex and not very precise, since the individual errors typically add up to a larger total error.

Other conventional methods determine corrected parameter values based on measured positioning errors in the Cartesian coordinate system by starting from a raw transformation based on measured parameters or based on fabrication dimensions. Such methods are described, for example, in WO 99/28097 and DE 19 80 6085 A1. Because the kinematic transformation typically involves rather complex transcendent functions, the corrected parameter values are computed mostly with numeric equation solvers and/or with numeric optimization methods. These methods include the so-called descent methods, with the Newton-method being the most widely known method.

It is evident that a parallel-kinematic machine can only be as accurate as the information about the underlying transformation and the transformation parameters, unless an error compensation method, for example in the Cartesian coordinate system, is employed. All calibration methods, with the exception of the error compensation methods, aim to exactly determine the transformation parameters. Conversely, in the error compensation method, a table with the compensation values associated with the different corresponding positions is stored and taken into account when computing the desired positions values. For positions between the support points in the table, the compensation values are interpolated.

Disadvantageously, these error compensation methods can only be calibrated in the region of the workspace where measurement values are available. Because of the non-linear nature of the transformation, these measurement support points have to be located on the fine grid (e.g., every 10 mm), which causes long measuring times. However, if all transformation parameters are determined with sufficient accuracy, then the operating precision of the machine improves also outside of the regions where measurement values are available. This method for determining the transformation parameters is therefore typically preferred over error compensation methods.

It would therefore be desirable and advantageous to provide an improved method for calibrating and operating machine units in machine tools and robotic devices that perform a parallel-kinematic motion in a motion space, which obviates prior art shortcomings and is able to specifically provide less computation-intensive convergent solutions.

SUMMARY OF THE INVENTION

The invention is directed to a method for calibrating parallel-kinematic machine units, and more particular to a method that uses an iterative process for generating a kinematic transformation. The method is robust and uses an iterative solution trial based on a simple and robust algorithm, wherein the measurement of the machine is integrated in the integration cycle and therefore executed multiple times. Advantageously, the number of integration cycles is small so that the method can be automated.

According to an aspect of the invention, a method is disclosed for calibrating machine units disposed in machine tools and robotic devices and moved by a parallel kinematic in a motion space. The machine units including between two and six drives that can be controlled independently of each other, either directly or via force transmitting and guide means or articulated joints that operate on a moved machine unit. A controller can set desired positions and/or desired trajectories in a Cartesian coordinate system and/or convert the Cartesian desired positions and desired trajectories into desired positions and/or desired trajectories of the two to six drives through a kinematic transformation $\vec{g}$, depending of a finite set of invariant machine parameters. The machine units can also include measurement and control devices for controlling the two to six drives to their desired positions and/or desired trajectories, and a device for measuring a deviation of an actual position from the position set by the controller.

The method according to the present invention includes the steps of:

a) determining on a number of K positions in the motion space of the moved machine unit the deviation of the actual position from the position set by the controller, b) linearizing for each position k of the K positions the nonlinear relationship between parameters errors and positioning errors by way of a Jacobi matrix $\underline{\underline{J}}_k$, c) forming a system of linear equations between parameters errors and positioning errors from the K linearized relationships, d) computing the parameter error by at least approximately solving the system of linear equations, e) computing new machine parameters from the machine parameters used in the transformation $\vec{g}$ with the computed parameter errors, and f) updating the kinematic transformation $\vec{g}$ stored in the controller with the updated machine parameters.

Advantageous embodiments of the method may include one or more of the following features. The number K of measurements can be selected so that the system of linear equations has a unique solution. However, the number K of measurements can also be greater than necessary to produce a system of linear equations with a unique solution, in which case the system of linear equations can be solved approximately using a least-squares method.

Advantageously, the parameter errors can be computed by including historic statistical data of measurement values and estimated parameter errors with a minimal variance. Also, new machine parameters can be computed by associating a weight with the parameter errors. A linearization can be performed about the machine parameters that form the basis of the kinematic transformation $\vec{g}$ and are stored in the controller.

To reduce the mathematical complexity, the Jacobi matrix $\underline{J}_k$ can be calculated numerically by using a difference quotient, either by using the kinematic transformation $\vec{g}$ stored in the controller as well as the Cartesian desired positions of the machine unit, or by using the indirect kinematic transformation $\vec{f}$ with the actual positions of the drive.

The method steps a) through f), as set forth above, can be repeated until the positioning error is smaller than a predetermined value, wherein during the subsequent repetition of steps a) through f) the positioning error can either be newly measured or computed with a predictive method based on a modified transformation. Alternatively or in addition, the steps a) through f) above may be repeated only until a positioning accuracy is achieved which requires a lesser number of support points than an error compensation without a prior application of the disclosed method. The error compensation is then performed with the reduced number of support points by repeating steps a) through f) and either newly measuring the positioning error or computing the positioning error with a predictive method based on a modified transformation.

The errors can be compensated in a Cartesian coordinate system or in a coordinate system of the axes drives.

For measuring the positioning error, a master workpiece with machining features can be scanned. The master workpiece can be, for example, a plate, and the machining features can be implemented as bores having a known position, a known diameter and a known depth. The positioning error can be measured with a measuring device, such as a stylus, laser interferometer and/or laser tracker.

Because the algorithm is simple, it can also be executed autonomously on the computer of the machine controller, which is advantageous in manufacturing applications by obviating the need for external computers.

BRIEF DESCRIPTION OF THE FIGURES

Other features and advantages of the present invention will be more readily apparent upon reading the following description of currently preferred exemplified embodiments of the invention with reference to the accompanying drawing, in which.

DETAILED DESCRIPTION OF ILLUSTRATED EMBODIMENTS

Figure 1:
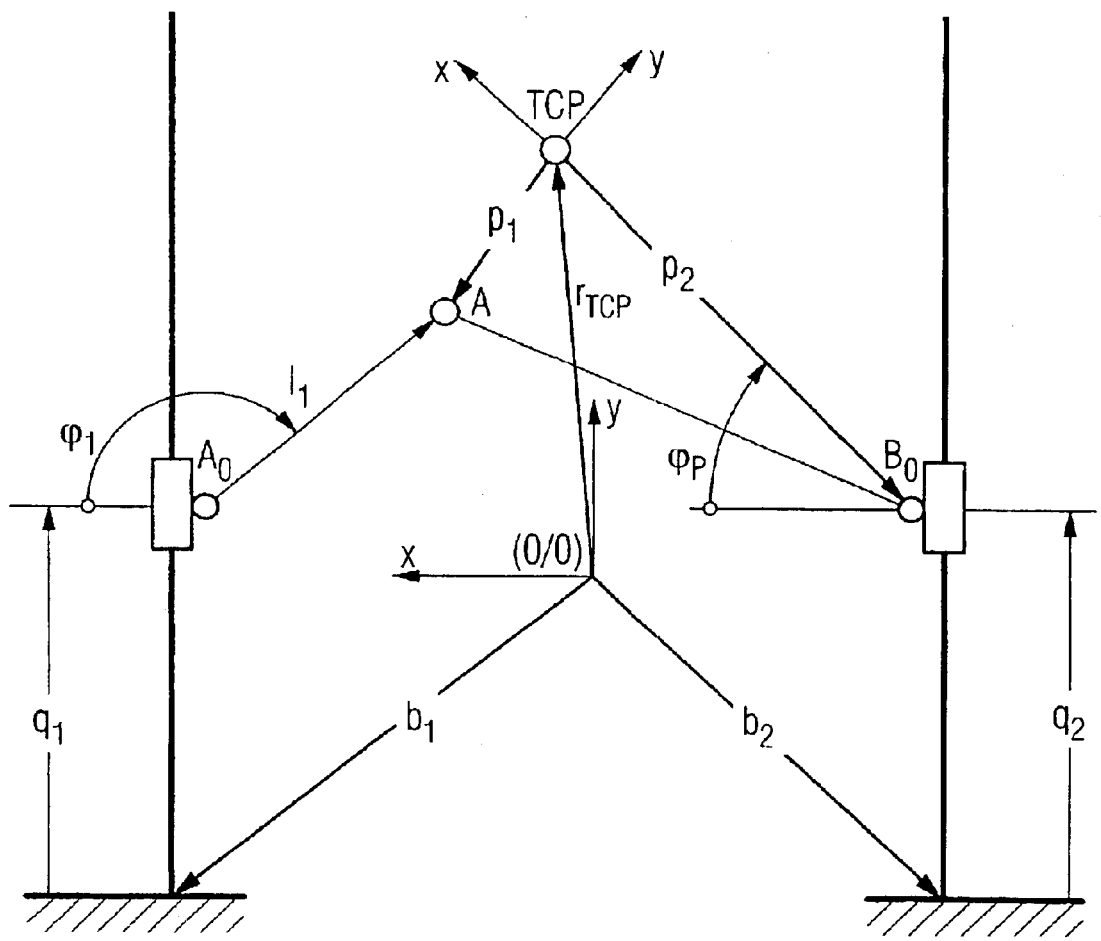
FIG. 1 shows exemplary parameters that describe a kinematic transformation, such as geometric values and/or fabrication dimensions.

Throughout all the Figures, same or corresponding elements are generally indicated by same reference numerals. These depicted embodiments are to be understood as illustrative of the invention and not as limiting in any way.

The basis for the method of the invention is a transformation that is linearized at the actual operating point (i.e., at the point of a position measurement) about the actual parameter values. From a plurality of position measurements, including associated drive coordinates as well as linearized transformations, a system of linear equations is generated at each iteration step. The parameters subject to correction can be accurately determined (if the system of equations can be inverted), depending on the number of the position measurements and the number of the parameters, or averaged (if the number of measured values is greater than the number of parameters to be corrected) using a least-squares calculation (using the pseudo-inverse of Moore-Penrose). New positioning errors are measured based on the corrected transformation and the optimization cycle is repeated. The multiple measurements do not pose a problem when an automated measurement cycle is used, since the method was found to converge after only a small number of measurements when a parallel kinematics as described in U.S. Pat. No. 6,328,510 B1 is employed.

Figure 2:
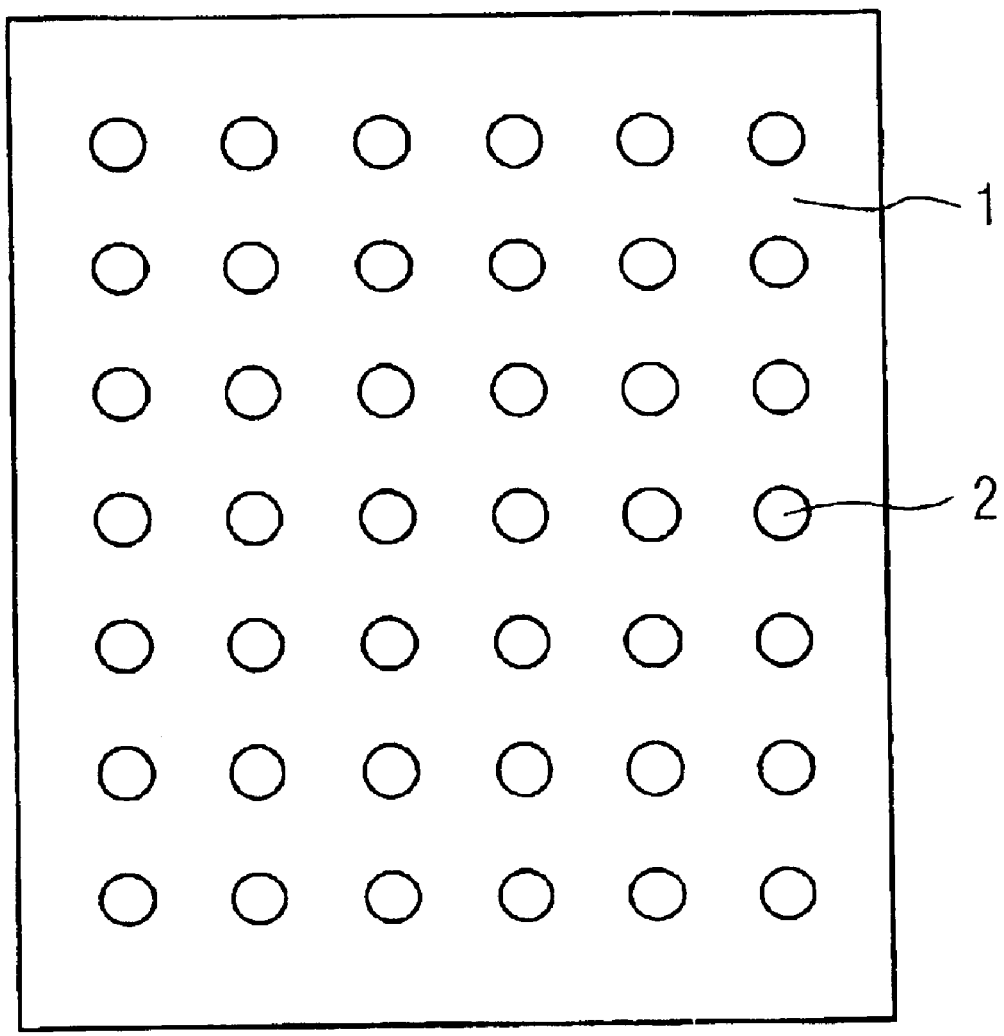
FIG. 2 shows an embodiment of a master workpiece in the form of a perforated plate with bores representing machining features to be scanned.
Figure 3:
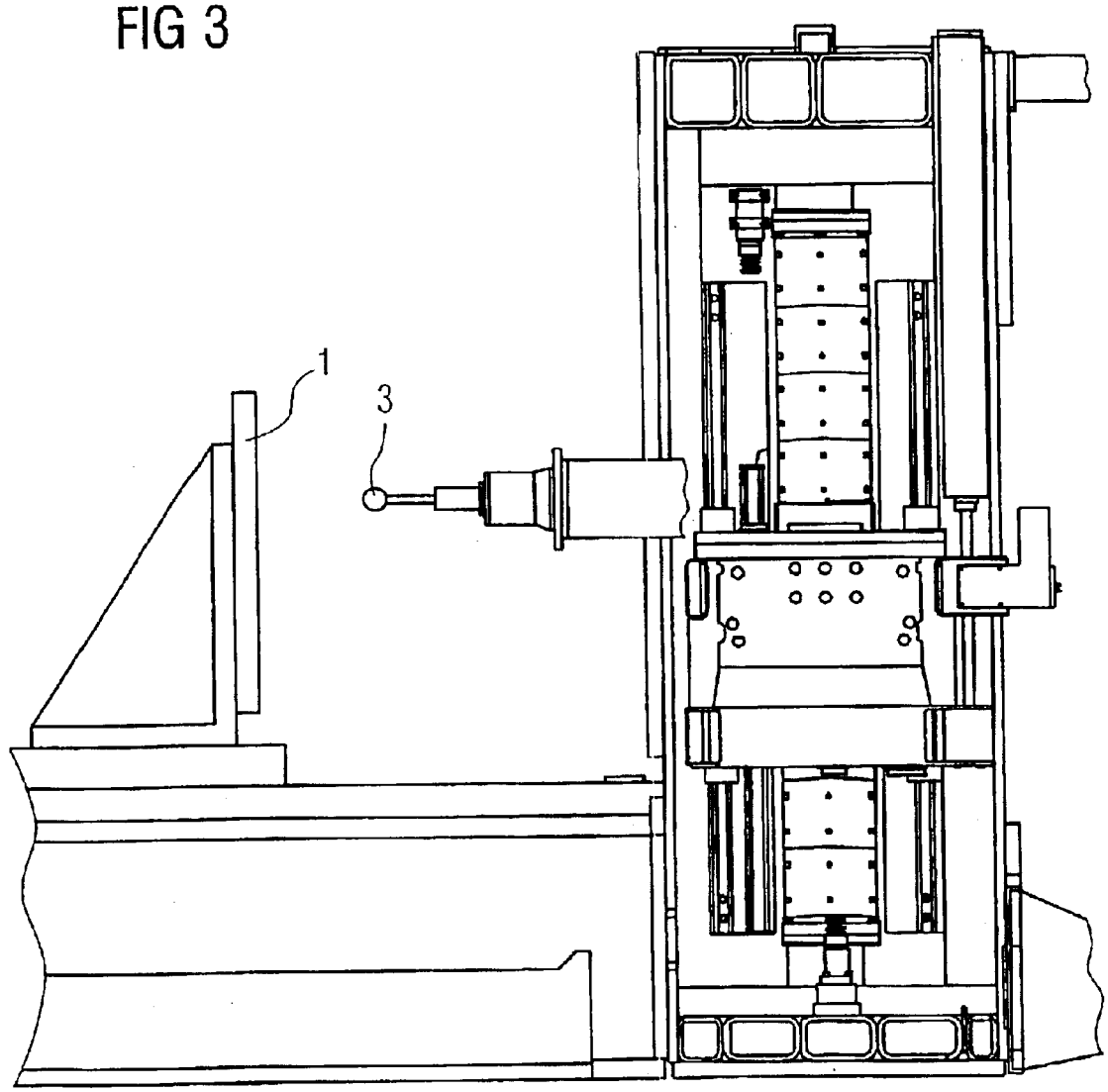
FIG. 3 shows an exemplary device for scanning of the perforated plate of FIG. 2.

A measurement setup for scanning an exemplary master workpiece with machining features of known dimensions and position is shown in FIG. 3. The exemplary master workpiece can be in the form of a perforated plate 1, as shown in greater detail in FIG. 2. The bores 2 have a known position, a known diameter and a known depth. The measuring tool can be a sensor 3 in the form of a stylus, cooperating for example with a ruler, a laser interferometer, a laser tracker and the like.

The relationship, which allows the position of a machine unit that is moved by a parallel kinematics relative to a reference system to be computed from the totality of positions of all drives operating in parallel on this machine unit, is referred to as kinematic transformation, or more precisely as an indirect kinematic problem. The relationship can be expressed as a vector function $\vec{f}$ according to $$[xy \ldots ]^T := \vec{x} = \vec{f}([\alpha_1\ \alpha_2\ \ldots ]^T, [P_1\ P_2\ \ldots ]^T) \qquad \text{Eq. (1)}$$

wherein $\vec{x} := [x\ y\ \ldots ]^T$ is a vector in the Cartesian coordinates of the parallel-kinematically moved machine unit, $\vec{A} := [\alpha_1\ \alpha_2\ \ldots ]^T$ is the vector of the drive coordinates and $\vec{P} := [P_1\ P_2\ \ldots ]^T$ is the vector of the invariant transformation parameter.

The vectors in Cartesian coordinates are referenced to a stationery reference system MBS (machine reference system), with the position of the Tool Center Point (TCP) shown in FIG. 1. The vectors describe the operation of the parallel-kinematic disclosed in U.S. Pat. No. 6,328,510 B1. The vector of the drive coordinates in this machine corresponds to the 2-tupel $[q_1\ q_2]^T$ of FIG. 1, i.e., the coordinates of the left skid $A_0$ and right skid $B_0$.

The transformation parameters $\vec{P} := [P_1\ P_2\ \ldots ]^T$ include all geometric values (fabrication dimensions) described in the context of Eq. (1) and depicted in FIG. 1, with the following quantities:

| | |
|---|---|
| $b_1, b_2$ | indicates the starting points of the motion curves of the skids $A_0$ and $B_0$ in the machine reference system "MBS", |
| $n_1, n_2$ | indicates the direction vectors of the guides, |
| $l_1$ | indicates the distance between the joint centers of the links, |
| $p_1, p_2$ | indicates the coordinates of the centers of the joints or skids $A_0$ and $B_0$ in the platform coordinate system "PKS", |
| $W_1$ | indicates the coordinates of the point of intersection of both linear axes in the gear case in the gear case coordinate system "SKS", |
| $W_2$ | indicates the coordinates of the center of the joints of the gear box link in the SKS coordinate system, and |
| $0_{PKS}$ (=TCP) | indicates the fixed point on the gear box; origin of the "PKS", "TCP" is offset in the z-direction. |

If a desired position value $$\vec{x}_{soll} := [x \; y \; \cdots]^T_{soll}$$

in a parallel-kinematic NC-machine is to be set along a defined trajectory, then the values for the drive coordinates have to be computed section-by-section and processed in the drive controllers using the inverse function $\vec{g}$ of the vector function $\vec{f}$:

$$\vec{A}_{soll} := [\alpha_1 \; \alpha_2 \; \cdots]^T_{soll} = \vec{f}^{-1}(\vec{x}_{soll}, \vec{P}) =: \vec{g}(\vec{x}_{soll}, \vec{P}). \quad \text{Eq. (2)}$$

Eq. (2) is also referred to as direct kinematic problem.

Starting with a parameter vector $\vec{P}_i$ (stored in the controller) that operates in the control transformation, and an unknown parameter vector $\vec{P}_{mech}$ that operates in the actual machine, wherein i is the index of the iteration (starting with i=0 for the initial state, for example based on fabrication dimensions), several measurement values $\vec{x}_{ist,k}$ are obtained at different positions, as implied in FIG. 3, with $$\vec{x}_{ist,k} := [x \; y \; \cdots]^T_{ist,k}, \; k = 1 \ldots K, \quad \text{Eq. (3)}$$

with positioning errors $$\Delta \vec{x}_k := \vec{x}_{ist,k} - \vec{x}_{soll,k} \quad \text{Eq. (4)}$$

being computed from these measurement values. k=1 . . . K is the index of the measurements. The parameter error to be determined is $$\Delta \vec{P} := \vec{P}_{mech} - \vec{P}_i \quad \text{Eq. (5).}$$

The indirect kinematic problem of Eq. (1) can be linearized for the best-known parameter vector $\vec{P}_i$, with the index i referring to the last iteration:

$$\Delta \vec{x}_k := \vec{x}_{ist,k} - \vec{x}_{soll,k} \quad \text{Eq. (6)}$$

$$= \begin{bmatrix} \frac{\partial f_x}{\partial P_1} & \frac{\partial f_x}{\partial P_2} & \cdots \\ \frac{\partial f_y}{\partial P_1} & \frac{\partial f_y}{\partial P_2} & \cdots \\ \vdots & \vdots & \ddots \end{bmatrix}_{\vec{P}_i, \vec{A}_k} (\vec{P}_{mech} - \vec{P}_i) =: \underline{J}_{i,k} \cdot \Delta \vec{P}_i.$$

The actual parameter vector $\vec{P}_{mech}$ is hereby associated with the actual or measured position vector $\vec{x}_{ist,k}$, whereas the best-known parameter vector $\vec{P}_i$ is associated with the theoretically achievable position vector $\vec{x}_{soll,k}$. The relationship between the actual (i.e., i-th) parameter error and the k-th measurement is provided by the Jacobi matrix $\underline{J}_{i,k}$ at the location of the best-known parameter in iteration step i as well as at the location of the drive coordinates associated with the k-th measurement. Eq. (6) can only be applied to the indirect kinematic problem of Eq. (1). However, the Jacobi matrix $\underline{J}_{i,k}$ can also be derived from the direct kinematic problem according to Eq. (2), as discussed in more detail below.

Since all conventional machines have more parameters than degrees of freedom, the Jacobi matrix $\underline{J}_{i,k}$ in Eq. (6) cannot be inverted, i.e., the system of linear equations (6) which evaluates exactly one measurement, cannot be solved. Accordingly, several measurements have to be included for determining the parameter errors from Eq. (6). A system of linear equations is then formed from exactly as many measurements K, so that the system can be inverted:

$$\begin{bmatrix} \Delta \vec{x}_1 \\ \Delta \vec{x}_2 \\ \vdots \\ \Delta \vec{x}_K \end{bmatrix} = \begin{bmatrix} \underline{J}_{i,1} \\ \underline{J}_{i,2} \\ \vdots \\ \underline{J}_{i,K} \end{bmatrix} \cdot \Delta \vec{P}_i =: \underline{\underline{J}}_i \cdot \Delta \vec{P}_i \quad \text{Eq. (7)}$$

If the system can be inverted, then the following parameter error is obtained $$\Delta \vec{P}_i = \underline{\underline{J}}_i^{-1} \begin{bmatrix} \Delta \vec{x}_1 \\ \Delta \vec{x}_2 \\ \vdots \\ \Delta \vec{x}_K \end{bmatrix} \quad \text{Eq. (8)}$$

If more measurements are to be evaluated than are required to satisfy the criteria for inversion, then $\underline{\underline{J}}_i^{-1}$ can be replaced by the corresponding Moore-Penrose pseudo-inverse (see, for example, Zurmühl, Falk: "Matrix Theory", Chapter 8.6 and 12.1; Springer 1992). One obtains instead of (8):

$$\Delta \vec{P}_i = \left( \underline{\underline{J}}_i^T \cdot \underline{\underline{J}}_i \right)^{-1} \cdot \underline{\underline{J}}_i^T \cdot \begin{bmatrix} \Delta \vec{x}_1 \\ \Delta \vec{x}_2 \\ \vdots \\ \Delta \vec{x}_K \end{bmatrix} \quad \text{Eq. (9)}$$

The computed parameter error vector is optimized by the method of least-squares, since not all measurements are compatible. Practical tests have shown that measurement errors can be compensated and that the computational accuracy can be improved by including a larger number of measurement points, within certain limits. Important for the selection of the measurement points is not only their overall number, but also their distribution in the workspace. If the distribution is poor, for example, if the measurement locations are spaced too closely, then the potential inversion of the matrix $\underline{J}_i$ and/or $\underline{J}_i^T \cdot \underline{J}_i$ is degraded, which can cause numerical errors.

If in the least-squares minimization according to Eq. (9) certain parameters are preferred and other parameters are only changed in small steps, then the method can be improved by incorporating statistical historical data about individual parameters and about the measurements. Both the parameter errors and the measurements can here be regarded as stochastic variables with a zero mean. The following covariance matrices can be associated therewith $$\underline{\Pi} = E\{\Delta \vec{P} \cdot \Delta \vec{P}^T\} \text{ or } \underline{X}_K = E\left\{ \begin{bmatrix} \Delta \vec{x}_1 \\ \Delta \vec{x}_2 \\ \vdots \\ \Delta \vec{x}_K \end{bmatrix} \cdot \begin{bmatrix} \Delta \vec{x}_1 \\ \Delta \vec{x}_2 \\ \vdots \\ \Delta \vec{x}_K \end{bmatrix}^T \right\}, \quad \text{Eq. (10)}$$

wherein the operator E indicates the generation of an expected value. Both covariance matrices can be populated with historical values about the expected accuracies. Since parameter errors as well as measurement errors are generally uncorrelated, the covariance matrices will typically consists only of diagonal elements (i.e. variances that are identical to the squares of the standard deviation). The accuracy of measurement errors is typically determined by the measurement procedures, so that the covariance matrix of the measurement errors will also be independent of the individual measurements and the iteration step. This yields the scalar variance $\sigma^2(x)$ of the measurement and the K-dimensional unit matrix $\underline{I}_K$ $$\underline{X}_K = \sigma^2(x) \cdot \underline{I}_K. \quad \text{Eq. (11)}$$

Regarding the covariance matrix of the parameter errors, different accuracies can be introduced for determining the parameters from the fabrication dimensions. For example, in the machine described in U.S. Pat. No. 6,328,510 B1, the direction vectors of the guides are parallel within better than 0.01 mm, whereas the origins of the linear measurement systems of the two Y-carriages and therefore the Y-components of the parameters $b_1$, $b_2$ can range from 0.1 mm to several mm. Significantly different accuracies are also present if a previously calibrated machine is repaired, whereby certain parameters are changed and other parameters retain their original values. If good approximate values for the diagonal elements of the covariance matrices are available, for example as empirically determined variances, then the accuracy of the computed parameters can be enhanced by using the following formula for the expected linear, true estimated value with minimal covariance in the case that the number of measurements exceeds the number of parameters:

$$\Delta \vec{P}_i = \left( \underline{J}_i^T \cdot \underline{X}_K^{-1} \cdot \underline{J}_i + \underline{\Pi}^{-1} \right)^{-1} \cdot \underline{J}_i^T \cdot \underline{X}_K^{-1} \cdot \begin{bmatrix} \Delta \vec{x}_1 \\ \Delta \vec{x}_2 \\ \vdots \\ \Delta \vec{x}_K \end{bmatrix} \quad \text{Eq. (12)}$$

$$= \left( \underline{J}_i^T \cdot \underline{J}_i + \sigma^2(x) \cdot \underline{\Pi}^{-1} \right)^{-1} \cdot \underline{J}_i^T \cdot \begin{bmatrix} \Delta \vec{x}_1 \\ \Delta \vec{x}_2 \\ \vdots \\ \Delta \vec{x}_K \end{bmatrix}$$

(Source: K. Brammer/G. Siffling: Kalman-Bucy-Filter, S. 71; Oldenbourg, 1989). Eq. (12) is different from Eq. (9) only by the additive term in parentheses, as defined in Eq. (11). When the method is executed iteratively several times, then the covariance matrix of the parameter error could actually be updated based on the already included measurements, since the statistical historical data are thereby changed. This would result in a Kalman filter of a stationary process, albeit for the special situation that the dimension of the measurement vector is greater than the dimension of a state vector (i.e., parameter vector) to be determined.

After the parameter error vector has been determined, the iteration method is completed by determining a new parameter vector with Eq. (5):

$$\vec{P}_{i+1} = \vec{P}_i + \Delta \vec{P}_i \quad \text{Eq. (13).}$$

The number of iteration steps can be reduced if an oscillatory behavior, i.e. overshoot of the iteration steps, is observed during iteration:

$$\vec{P}_{i+1} = \vec{P}_i + \eta \cdot \Delta \vec{P}_i \quad \text{Eq. (14).}$$

In the parallel kinematics described in U.S. Pat. No. 6,328,510 B1, a weighting factor of $\eta = 0.6$ has proven to be advantageous, without the need for including statistical historical data according to Eq. (9).

The Jacobi matrix in Eq. (6) assumes that information is available about the indirect kinematic problem. The following computation can be used to apply the method also to the direct kinematic problem. If the direct kinematic problem of Eq. (2) is linearized about the set position $\vec{x}_{soll}$ and about the parameter vector $\vec{P}_i$ operating in the control transformation, one obtains $$\vec{A} - \vec{A}_{soll} = \frac{\partial \vec{g}}{\partial \vec{x}}\bigg|_{\vec{x}_{soll}, \vec{P}_i} \cdot [\vec{x} - \vec{x}_{soll}] + \frac{\partial \vec{g}}{\partial \vec{P}}\bigg|_{\vec{x}_{soll}, \vec{P}_i} \cdot [\vec{P} - \vec{P}_i] \quad \text{Eq. (15)}$$

wherein $$\frac{\partial \vec{g}}{\partial \vec{x}}\bigg|_{\vec{x}_{soll}, \vec{P}_i} \text{ and } \frac{\partial \vec{g}}{\partial \vec{P}}\bigg|_{\vec{x}_{soll}, \vec{P}_i},$$

are also Jacobi matrices.

$$\frac{\partial \vec{g}}{\partial \vec{x}}\bigg|_{\vec{x}_{soll}, \vec{P}_i}$$

is here typically regular and can be inverted. To obtain a linearized relationship between parameter error and positioning error, Eq. (15) is set to zero, the error definitions of Eq. (4) and (5) are inserted, and the Eq. (15) is solved for the positioning error. Assuming to that the equation can be inverted, one obtains $$\Delta \vec{x}_k = -\left[\frac{\partial \vec{g}}{\partial \vec{x}}\bigg|_{\vec{x}_{soll}, \vec{P}_i}\right]^{-1} \cdot \frac{\partial \vec{g}}{\partial \vec{P}}\bigg|_{\vec{x}_{soll}, \vec{P}_i} \cdot \Delta \vec{P}_i \qquad \text{Eq. (16)}$$

and hence the desired Jacobi matrix $\underline{\underline{J}}_{i,k}$ in Eq. (6)

$$\underline{\underline{J}}_{i,k} = -\left[\frac{\partial \vec{g}}{\partial \vec{x}}\bigg|_{\vec{x}_{soll}, \vec{P}_i}\right]^{-1} \cdot \frac{\partial \vec{g}}{\partial \vec{P}}\bigg|_{\vec{x}_{soll}, \vec{P}_i}. \qquad \text{Eq. (17)}$$

The Jacobi matrix is advantageously computed numerically, so that the method can be applied without introducing additional mathematical complexity. This is done based on the transformation $\vec{f}$, or by forming difference quotients based on the transformation $\vec{g}$, which has to be created anyway for implementation in the controller. This is shown below for an exemplary elements of the Jacobi matrix of Eq. (6), namely for the x-coordinate and the parameter number s according to the following equation, by varying the s-th element of the parameter vector:

$$\frac{\partial f_x}{\partial P_s}\bigg|_{\vec{P}_i, \vec{A}_k} = \frac{f_x([P_1 \cdots P_{s-1} \; P_s + \Delta p \; P_{s+1} \cdots]^T) - f_x([P_1 \cdots P_{s-1} \; P_s \; P_{s+1} \cdots]^T)}{\Delta p}\bigg|_{\vec{A}_k}, \qquad \text{Eq. (18)}$$

wherein $\Delta p$ is a parameter increment that is small compared to the parameter values.

A basic accuracy can be achieved within a few iteration cycles (for example 2 cycles), so that the parallel kinematics achieves sufficient basic accuracy in a first iteration, for example as straightness of the path. With this basic accuracy, a conventional error compensation method can be executed with a relatively small number of support points. The compensation method can be performed with the perforated plate 1 (with a coarse grid) shown in FIG. 2. Such error compensation method can be applied in the Cartesian coordinate system as well as in the coordinate system of the axes drives. This combination of methods can be applied when the kinematic transformation $\vec{g}$ stored in the controller does not adequately describe the actual mechanical situation in the machine. This happens, for example, when the paths of the drive carriages are assumed to be ideally straight in the transformation, by in reality have an inevitable curvature.

According to another embodiment of the invention, the iterative process required by the nonlinearity of the transformation is not performed at every step with a new measurement, but the error expected following a change in a parameter can be predicted based on the changed transformation and the historical measurement values. Only a few measurements, in an optimal case only a single measurement, may be sufficient with this embodiment. It is therefore similar with the aforedescribed descent method, however with the difference that it is specifically adapted to the optimization task and hence converges extremely fast and reliably.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A method for calibrating machine units disposed in machine tools and robotic devices and moved by a parallel kinematic in a motion space, the machine units including between two and six drives that can be controlled independently of each other, directly or via force transmitting and guide means or articulated joints that operate on a moved machine unit, a controller for setting desired positions and/or desired trajectories in a Cartesian coordinate system and for converting the Cartesian desired positions and desired trajectories into desired positions and/or desired trajectories of the two to six drives through a kinematic transformation $\vec{g}$, depending of a finite set of invariant machine parameters, measurement and control devices for controlling the two to six drives to their desired positions and/or desired trajectories, with a device for measuring a deviation of an actual position from the position set by the controller, the method comprising the steps of a) determining on a number of K positions in the motion space of the moved machine unit the deviation of the actual position from the position set by the controller, b) linearizing for each position k of the K positions the nonlinear relationship between parameters errors and positioning errors by way of a Jacobi matrix $\underline{\underline{J}}_k$, c) forming a system of linear equations between parameters errors and positioning errors from the K linearized relationships, d) computing the parameter error by at least approximately solving the system of linear equations, e) computing new machine parameters from the machine parameters used in the transformation $\vec{g}$ with the computed parameter errors, and f) updating the kinematic transformation $\vec{g}$ stored in the controller with the updated machine parameters.

2. The method of claim 1, wherein the number K of measurements is selected so that the system of linear equations has a unique solution.

3. The method of claim 1, wherein the number K of measurements is greater than necessary to produce a system of linear equations with a unique solution and wherein the system of linear equations is solved approximately using a least-squares method.

4. The method of claim 3, wherein the parameter errors are computed by including historic statistical data of measurement values and estimated parameter errors with a minimal variance.

5. The method of claim 1, wherein new machine parameters are computed by associating a weight with the parameter errors.

6. The method of claim 1, wherein the linearization is performed about the machine parameters that form the basis of the kinematic transformation $\vec{g}$ and are stored in the controller.

7. The method of claim 1, wherein the Jacobi matrix $\underline{\underline{J}}_k$ is calculated numerically using a difference quotient, making use of the kinematic transformation $\vec{g}$ stored in the controller as well as the Cartesian desired positions of the machine unit, or of the indirect kinematic transformation $\vec{f}$ with the actual positions of the drive.

8. The method of claim 1, and further repeating the steps a) through f) until the positioning error is smaller than a predetermined value, wherein during the subsequent repetition of steps a) through f) the positioning error is either newly measured or computed with a predictive method based on a modified transformation.

9. The method of claim 8, wherein the predetermined value is defined such that a subsequent error compensation using the method can be performed with a lesser number of support points than an error compensation performed without using the method.

10. The method of claim 9, wherein the errors are compensated in a Cartesian coordinate system.

11. The method of claim 9, wherein the errors are compensated in a coordinate system of the axes drives.

12. The method of claim 1, wherein for measuring the positioning error, a master workpiece with machining features is scanned.

13. The method of claim 12, wherein the master workpiece is a plate and the machining features are implemented as bores having a known position, a known diameter and a known depth.

14. The method of claim 1, wherein the positioning error is measured with a measuring device selected from the group consisting of stylus, laser interferometer and laser tracker.

* * * * *